United States Patent
Wulff et al.

(10) Patent No.: US 10,735,274 B2
(45) Date of Patent: Aug. 4, 2020

(54) PREDICTING AND FORECASTING ROAMING ISSUES IN A WIRELESS NETWORK

(71) Applicant: Cisco Technology, Inc., San Jose, CA (US)

(72) Inventors: Sharon Shoshana Wulff, Zurich (CH); Grégory Mermoud, Veyras (CH); Jean-Philippe Vasseur, Saint Martin D'uriage (FR)

(73) Assignee: Cisco Technology, Inc., San Jose, CA (US)

(*) Notice: Subject to any disclaimer, the term of this patent is extended or adjusted under 35 U.S.C. 154(b) by 24 days.

(21) Appl. No.: 15/880,992

(22) Filed: Jan. 26, 2018

(65) Prior Publication Data
US 2019/0239158 A1 Aug. 1, 2019

(51) Int. Cl.
| | |
|---|---|
| H04L 12/24 | (2006.01) |
| H04W 48/20 | (2009.01) |
| H04W 24/02 | (2009.01) |
| H04W 24/08 | (2009.01) |
| H04W 24/10 | (2009.01) |

(Continued)

(52) U.S. Cl.
CPC ............ H04L 41/16 (2013.01); H04L 41/147 (2013.01); H04W 24/02 (2013.01); H04W 24/08 (2013.01); H04W 24/10 (2013.01); H04W 48/20 (2013.01); H04W 88/08 (2013.01); H04W 88/18 (2013.01)

(58) Field of Classification Search
CPC ..... H04W 48/20; H04W 16/18; H04W 24/02; H04L 43/08
See application file for complete search history.

(56) References Cited

U.S. PATENT DOCUMENTS

| | | |
|---|---|---|
| 2006/0212142 A1 | 9/2006 | Madani et al. |
| 2015/0193694 A1 | 7/2015 | Vasseur et al. |
| 2015/0195145 A1 | 7/2015 | Di Pietro et al. |

(Continued)

OTHER PUBLICATIONS

Jason Brownlee "How to Backtest Machine Learning Models for Time Series Forecasting" https://machinelearningmastery.com/backtest-machine-learning-models- . . . ; pp. 1-16.

*Primary Examiner* — Marcus Smith
(74) *Attorney, Agent, or Firm* — Behmke Innovation Group LLP; Kenneth J. Heywood; James J. Wong

(57) ABSTRACT

In one embodiment, a network assurance service applies labels to feature vectors of network characteristics associated with a plurality of wireless access points in the network. An applied label for a feature vector indicates whether the access point associated with the feature vector experienced a threshold number of onboarding delays within a given time window. The service, based on the feature vectors and labels, trains a plurality of machine learning-based classifiers to predict onboarding delays, and uses one or more of the trained plurality of classifiers to predict onboarding delays for a particular access point. The service calculates one or more classifier performance metrics for the one or more classifiers based on the predicted onboarding delays for the particular access point. The service selects a particular one of the classifiers to monitor the network characteristics associated with the particular access point, based on the one or more classifier performance metrics.

17 Claims, 9 Drawing Sheets

(51) Int. Cl.
*H04W 88/08* (2009.01)
*H04W 88/18* (2009.01)

(56) References Cited

U.S. PATENT DOCUMENTS

| | | |
|---|---|---|
| 2016/0021126 A1 | 1/2016 | Vasseur et al. |
| 2017/0215094 A1* | 7/2017 | Akoum ................ H04L 43/026 |
| 2017/0245136 A1* | 8/2017 | Ong ..................... H04W 36/245 |
| 2017/0339584 A1* | 11/2017 | Ketonen ............... H04W 24/04 |
| 2018/0308013 A1* | 10/2018 | O'Shea ................... G06N 3/08 |
| 2018/0332483 A1* | 11/2018 | Yoon .................... H04W 24/04 |
| 2019/0036788 A1* | 1/2019 | Gupta ................... H04L 41/147 |
| 2019/0149425 A1* | 5/2019 | Larish ................. G06N 3/0454 |
| | | 706/16 |
| 2019/0199599 A1* | 6/2019 | Zavesky ................ H04L 41/16 |

\* cited by examiner

PREDICTING AND FORECASTING ROAMING ISSUES IN A WIRELESS NETWORK

TECHNICAL FIELD

The present disclosure relates generally to computer networks, and, more particularly, to predicting and forecasting roaming issues in a wireless network.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
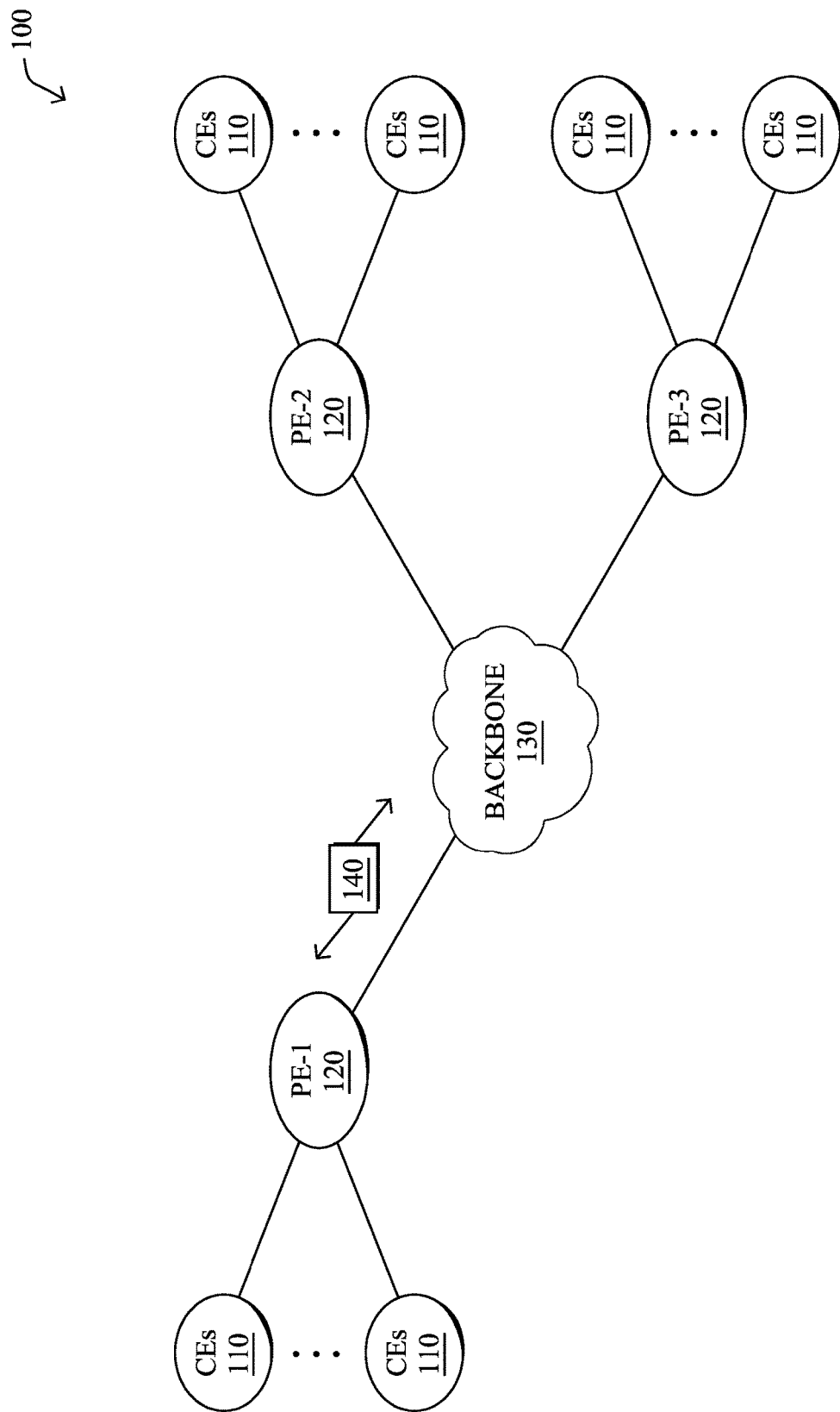
FIGS. 1A-1B illustrate an example communication network.

According to one or more embodiments of the disclosure, a network assurance service applies labels to feature vectors of network characteristics associated with a plurality of wireless access points in the network. An applied label for a feature vector indicates whether the access point associated with the feature vector experienced a threshold number of onboarding delays within a given time window. The service, based on the feature vectors and labels, trains a plurality of machine learning-based classifiers to predict onboarding delays, and uses one or more of the trained plurality of classifiers to predict onboarding delays for a particular access point. The service calculates one or more classifier performance metrics for the one or more classifiers based on the predicted onboarding delays for the particular access point. The service selects a particular one of the classifiers to monitor the network characteristics associated with the particular access point, based on the one or more classifier performance metrics.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
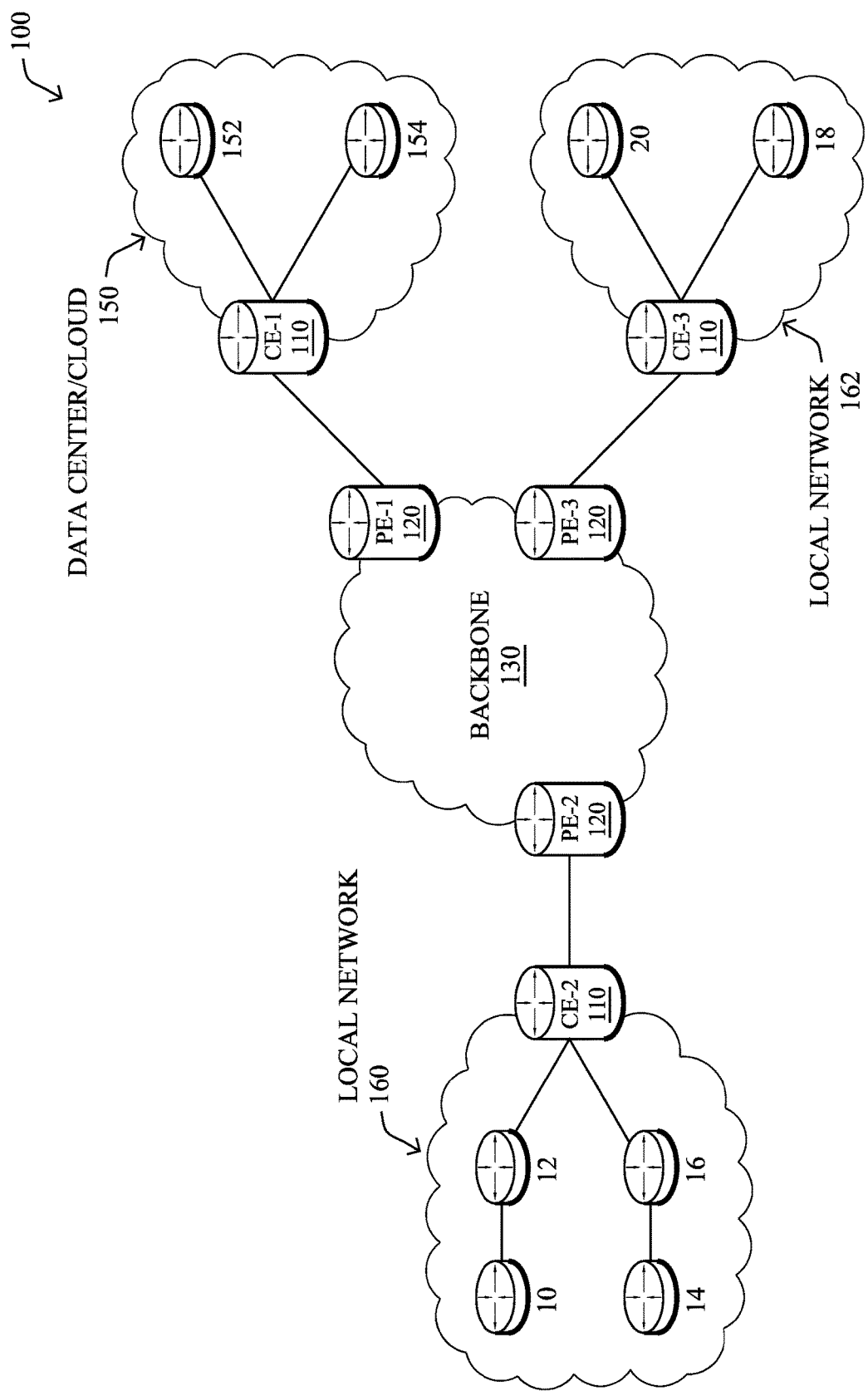

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
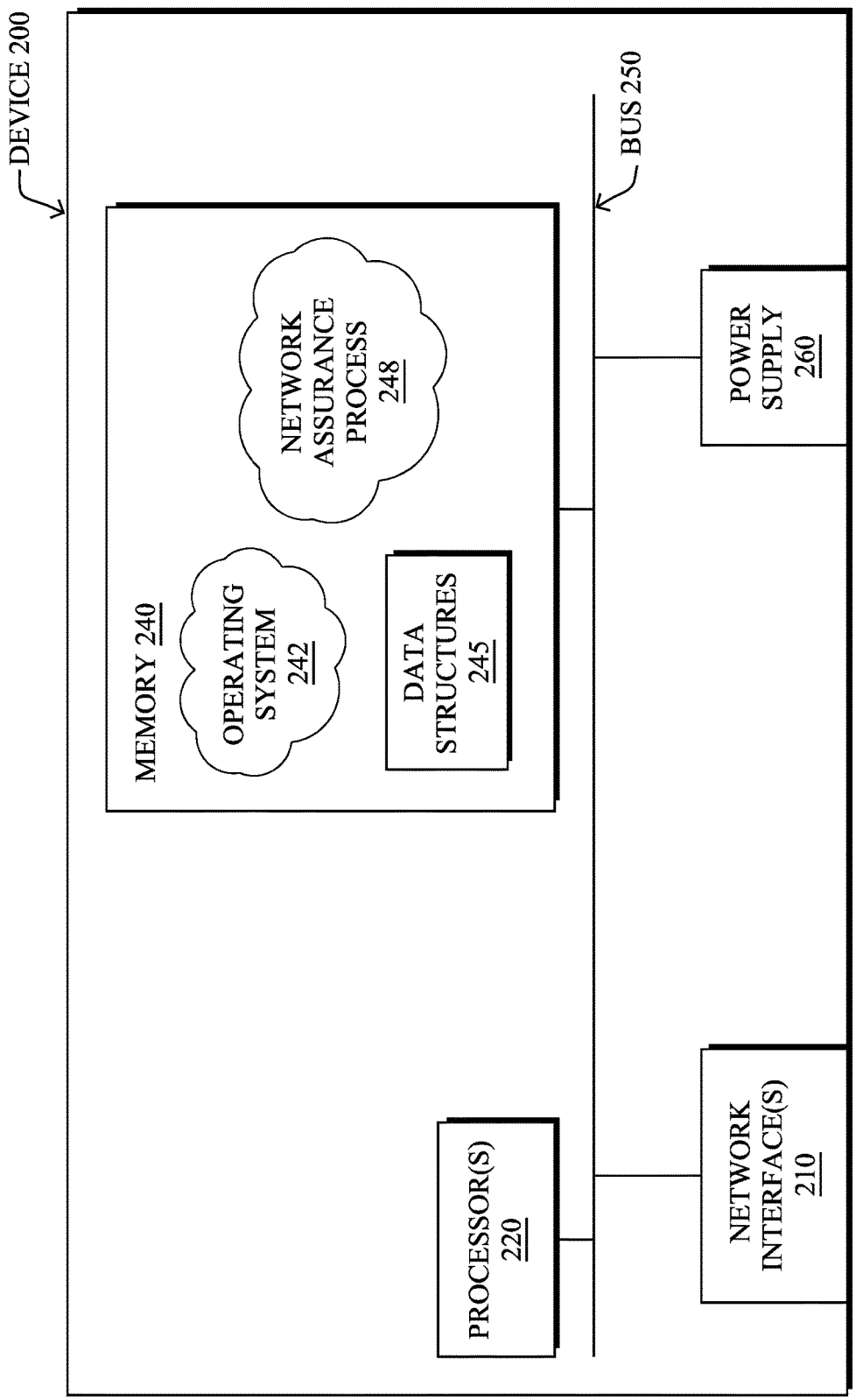
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
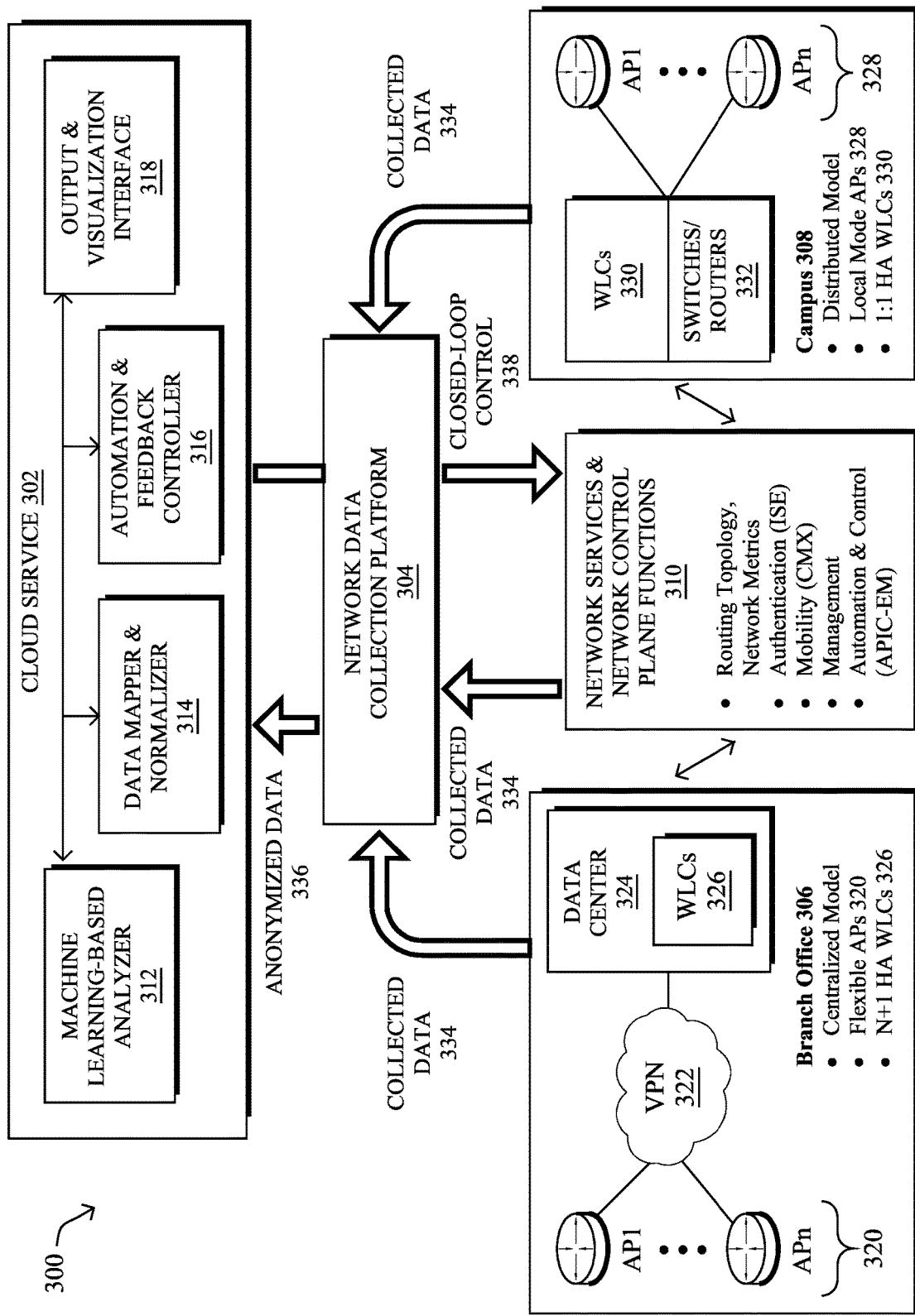
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, in wireless networks, a myriad of data points are accessible via the wireless controllers (e.g., WLCs, etc.) that may indicate roaming events, AP/user characteristics, network indicators, etc., in addition to external services (e.g., DHCP, etc.) error/message codes, and other such network characteristics. This information can be leveraged to predict future problems in the network. For example, the network assurance service may use machine learning to learn over time a previously an unnoticeable DHCP issue that could impact the ability of users to join the network, by predicting an increase in the number of expected users on the network with a certain device type.

In the specific case of predicting problems related to wireless roaming and network joins, the task formulation for training a machine learning model includes:

Predicted metric/statistics: a natural first-order choice would be the percentage of failed attempts in some timeframe. However, as single users can trigger many failed attempts, this metric leads to noisy/skewed labeled data as well as potentially negligible value to the network administrator. Another aspect of the predicted value is whether the network assurance service predicts an actual value (regression) or a categorical value (yes/no/maybe). When the use case does not require a specific value, but the value is merely a proxy for a categorical response, it is often better from a machine learning perspective to phrase the problem as a binary/categorical task.

Granularity: in what time/AP/user units does the network assurance service try to predict the metric? Note that by predict, this typically means "forecast" the future. Other challenges include gathering the right data, filtering noisy measurements, setting up a meaningful representation (features) and the data split into train validation, test and production.

Predicting and Forecasting Roaming Issues in a Wireless Network

The techniques herein allow for the forecasting of roaming and joining issues given the current and past network characteristics and a history of client roaming and joining patterns. In some aspects, a network assurance service may use supervised machine learning, in which the network characteristics (e.g., measurements, client information, etc.) and the failure/success indication at each time point are represented as pairs of feature vectors and labels, respectively. During training, the learning process may take as input a sample of the measurement vectors with their labels and, in turn, outputs a classifier that can then be applied to predict the labels (success/failure) of future measurements. In further aspects, radios/APs can be grouped according to their degree of similarity, and a group-based classifier may be trained for prediction. The classifier demonstrating the best classifier performance can then be selected for monitoring any particular one of the APs.

Specifically, according to one or more embodiments of the disclosure as described in detail below, a network assurance service applies labels to feature vectors of network characteristics associated with a plurality of wireless access points in the network. An applied label for a feature vector indicates whether the access point associated with the feature vector experienced a threshold number of onboarding delays within a given time window. The service, based on the feature vectors and labels, trains a plurality of machine learning-based classifiers to predict onboarding delays, and uses one or more of the trained plurality of classifiers to predict onboarding delays for a particular access point. The service calculates one or more classifier performance metrics for the one or more classifiers based on the predicted onboarding delays for the particular access point. The service selects a particular one of the classifiers to monitor the network characteristics associated with the particular access point, based on the one or more classifier performance metrics.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
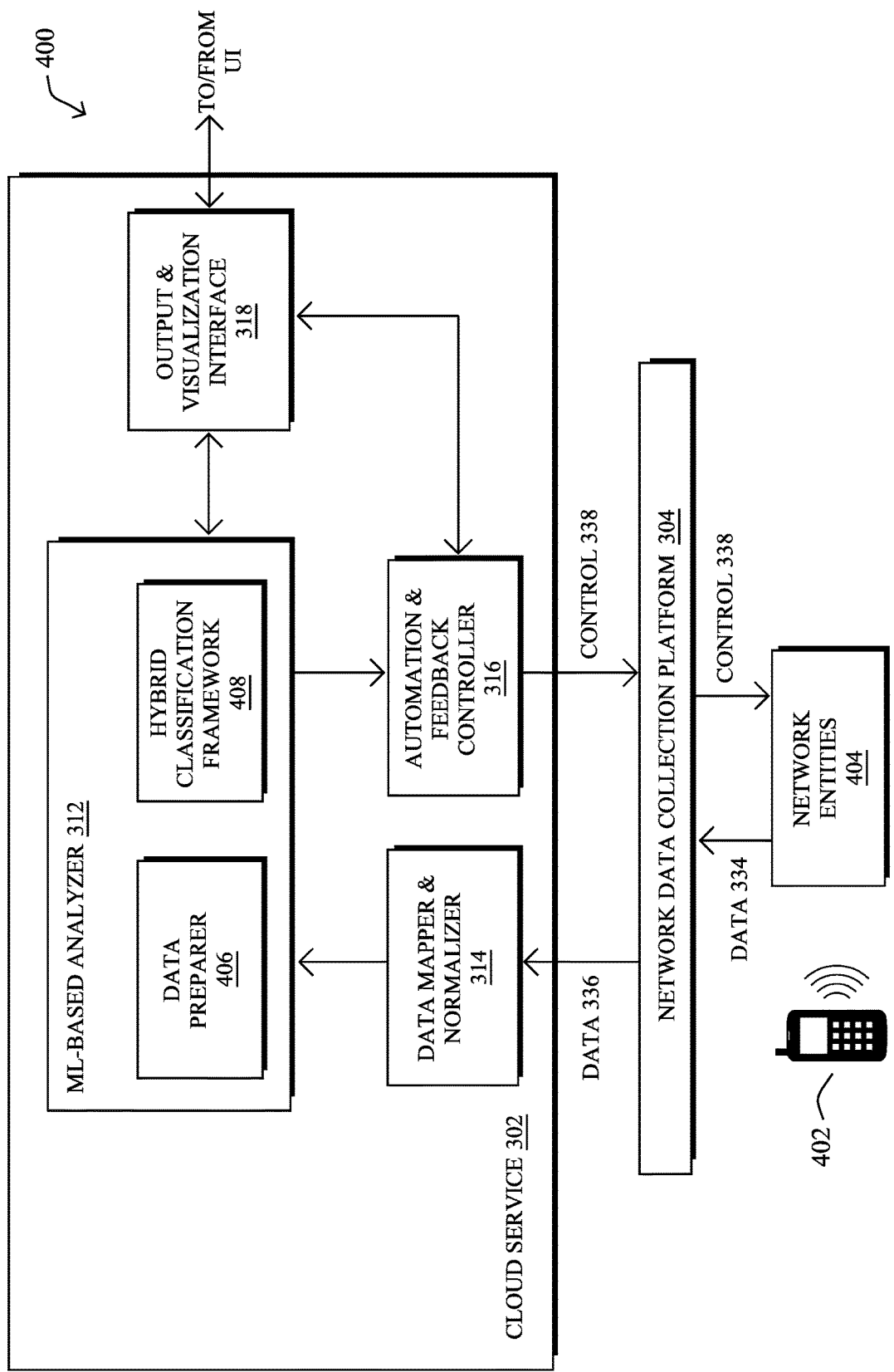
FIG. 4 illustrates an example architecture for predicting and forecasting roaming issues in a wireless network.

Operationally, FIG. 4 illustrates an example architecture 400 for predicting and forecasting roaming issues in a wireless network, according to various embodiments. At the core of architecture 400 may be the following components: a data preparer 406 and a hybrid classification framework 408. In some implementations, the components of architecture 400 may be implemented within a network assurance system, such as system 300 shown in FIG. 3. Accordingly, the components 406-408 of architecture 400 shown may be implemented as part of cloud service 302 (e.g., as part of machine learning-based analyzer 312), as part of network data collection platform 304, and/or on one or more network elements/entities 404 that communicate with one or more client devices 402 within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

In various embodiments, the techniques herein can be split into to key aspects:

Data Labeling—The network assurance service may obtain measured onboarding times, defined as the time between the first attempt of a client to join the network or roam to another AP and when the client is fully connected to the network or new AP. This can be used to forecast whether the number of long onboarding times per AP aggregated over a short period of time exceeds a certain threshold. Said differently, the variable of interest is the number of clients that experience a "long onboarding time," whereby "long" is determined relative to a threshold. Such onboarding delays can and do impact the user experience and can, in some cases, result in a loss of connectivity to a client.

Per AP/radio tuning of the prediction functions—The prediction (forecasting) system will learn (and predict) based on network characteristic data gathered from many radios. In various embodiments, a hybrid approach may be taken whereby multiple base classifiers are trained on subsets and potentially on all of the radios from which characteristic data is available. In an online fashion, for each radio, a specific classifier can be selected for use to monitor the radio.

As would be appreciated, different radios/APs generate signals (e.g., onboardings and network indicators) with different underlying distribution. This is not surprising as these signals are affected by the network connectivity usage, which naturally changes with the location of the AP (e.g. corridor vs. office vs. yard) and the nature of the institution which it serves (e.g. bank vs. university vs. train station). With respect to machine learning, this makes it extremely difficult, if not impossible, to train a classifier that is generalized across all radios/APs. The hybrid approach introduced herein allows a network assurance service to deploy a small number of classifiers, and choose in real-time which one to use, based on the characteristics of the test radio/AP under analysis.

As a supervised learning problem over time, the long onboarding time forecasting suffers from very imbalanced labeled data. Most of the time, the network works as expected, giving rise to short and successful onboardings. A very small portion of the captured measurements from the network include long onboardings (e.g., excessive onboarding delays). This results in a difficulty to keep the number of false positives low, namely periods of time with onboardings tagged as problematic. In some embodiments, the network assurance service may elect not to use any classifier for a given AP if, in any given time, a low precision period is encountered for the AP/radio.

In various embodiments, data preparer 406 may be configured to obtain data points from the various networking entities 404 involved, namely the WLC (rarely AP), DHCP/Radius servers, etc. of the monitored network. The gathered data is then processed by data preparer 406 as follows, according to various embodiments, by bucketing the network characteristic and onboarding data from the monitored network into time buckets. For example, the data may be grouped into buckets of 5 minute intervals.

For each bucket, data preparer 406 may then construct the bucket features (e.g., time signal) and label them (e.g., a ground truth time signal), accordingly. In particular, data preparer 406 may distinguish whether any of the "long" onboardings in a given time bucket are associated with an error code that can be attributed to a client action or, instead, to an error code that can be attributed to a network problem. In turn, onboarding delays that are client-caused may be ignored, in some embodiments. Data preparer 406 may then determine whether the time bucket has a threshold number of remaining "long" onboarding delays (e.g., onboardings that exceeded a defined threshold). Put together, the labeling rule becomes:

Label=1: There was at least one onboarding delay in a 5-minutes interval (e.g., an onboarding that took longer than 10 seconds) and does not have an error code associating it with a client's induced error.

Label=0, otherwise.

From a machine learning perspective, the features (e.g., network characteristics) can be divided into various sets, such as:

Error/label related features (in features time)
Roaming features
Radio properties
Time related features
Other network states properties Data preparer 406 may also split the resulting data into training and test data. In the techniques herein, the choice of base classifier is tuned and, more importantly, the threshold performance for the prediction for each radio based on its past, to aid in this selection. For example, during prototyping, the data associated with ⅔ of the APs/radios in the network was randomly chosen to create the base classifiers and the remaining ⅓ was used for classifier validation. In some cases, there may also be a forecasting gap whereby the features and labels signal are combined such that there is a certain gap (e.g., 30 minutes) between the feature time intervals and the label intervals.

By way of a more specific example, data preparer 406 may measure the onboarding time as the time between the first association message and either a RUN message, an association sent to a different AP/radio slot/sside, or no action on the side of the client for a certain amount of time (e.g., the end time is that of the last message). Data preparer 406 may then use a threshold of 10 second, to determine whether the onboarding delay is too long. Such a threshold may be based on actual observations of the monitored network and, typically, short onboardings are achieved in a matter of seconds or less, while long onboarding delays can be upward of even a minute or more.

Figure 5:
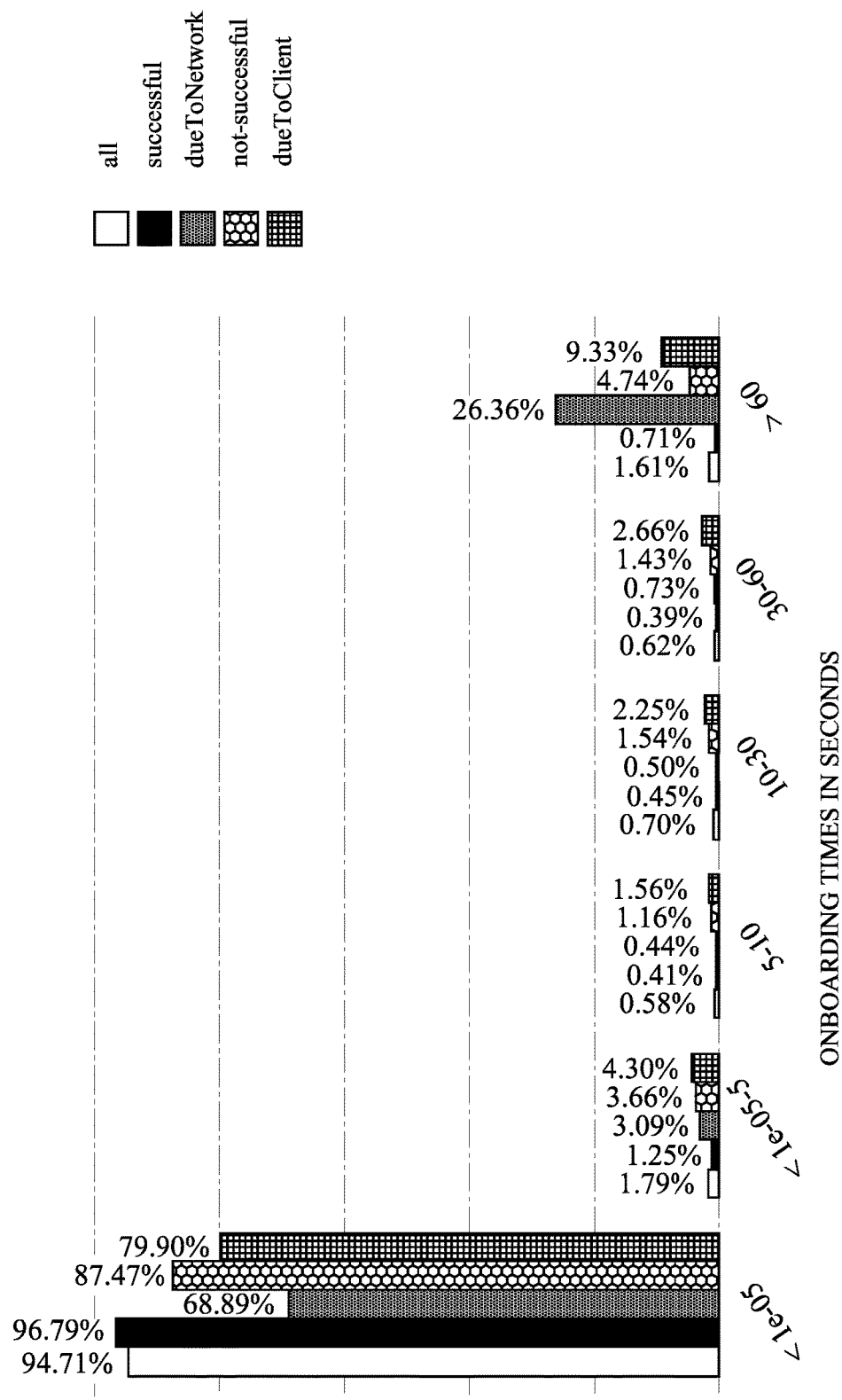
FIG. 5 illustrates an example plot of wireless onboarding times.

FIG. 5 illustrates an example plot 500 of wireless onboarding times. As shown, the onboarding times are broken down into time buckets and by group. The three onboarding groups are as follows: all, successful, and non-successful. In addition, there may also be two groups: dueToNetwork and duetoClient, that distinguish between onboarding delays that are caused by the network and those caused by the client. As shown, the majority of the onboardings, even the non-successful ones, take less than 0.0001 second. The second largest cluster for all groups are the onboardings that took longer than 60 seconds (right most).

While the true nature of the roaming signals is either continuous (e.g., network metrics such as interference) or discrete, yet asynchronous, most prediction frameworks operate on discrete and synchronous time signals (i.e., readings in fixed time intervals). Hence, the prediction setup herein consists of time buckets for which the network and onboarding signals are aggregated. The forecasting then amounts to predicting some aggregated metric over a pre-defined bucket of time in the future, given current and past metrics over buckets of time. In the specific scenario of long onboarding prediction, the most natural aggregated metric is the number or ratio of onboardings longer than 10 seconds, or other threshold, in the time interval (bucket). The label in a classification forecasting setting (unlike regression) is simply a binary synchronous signal with a value for each bucket, determined by a threshold operation on top of the aggregated metric. For example, a label can be '1' if the number of long onboardings in a 30 minutes bucket exceeds '5' and '0' otherwise.

As onboarding delays are manifestations of network problems, detected when clients are interacting with the system, the observed long onboarding session time does not tell exactly when the network problem started or ended. For this reason, the network assurance service may do any or all of the following, in various embodiments:

1. Use a rather short time interval (e.g., 5 minutes). The shorter the bucket, the more similar the aggregated signal is to the asynchronous underlying signal.
2. Smooth the labels across buckets. For example, a 5-minutes interval in which there is not an observed onboarding delay does not mean that there are no network problems present. Here, an explicit assumption may be made that, for two 5-minutes intervals, both with long onboardings, and these two intervals are not more than X minutes apart (here X=30 minutes), then there is a network problem during this in-between interval as well. In turn, all 5-minute intervals in between the two may also be labelled as positive, as well.

Figure 6:
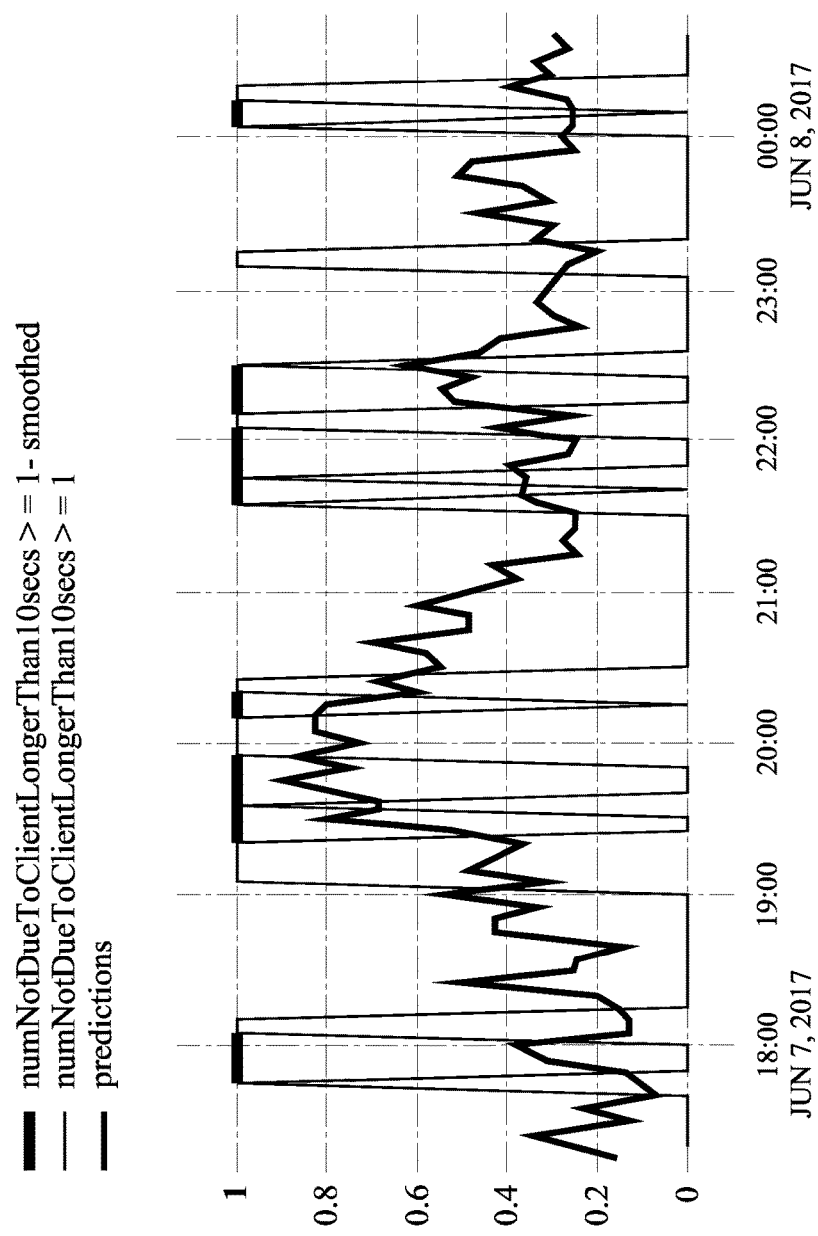
FIG. 6 illustrates an example plot of label smoothing.

FIG. 6 illustrates an example plot 600 of label smoothing, in some embodiments. As shown, plot 600 plots the label signal (e.g., number of long onboarding delays that exceed a threshold number in a single time interval) during a full time period of six hours for a particular AP/radio. More specifically, in plot 600, time buckets/intervals of 5 minutes were assessed to see whether at least one long onboarding delay occurred (e.g., the onboarding took longer than a defined threshold). As shown, the smoothing may entail connecting the 'peaks' of the intervals in which the threshold number of onboarding delays exceeded the threshold (e.g., ≥1), thus applying a label of '1' to the time periods/buckets in between, as well. A restricted subset of the onboardings was also used, to exclude onboardings where there was an indication of a client-induced error (hence the axis name of numNotToClient).

As noted, one complication of using machine learning to forecast failures is that the data (onboarding and network signals) coming from different radios seem to have different characteristics. An important principal of machine learning is that the training and test distributions should be the same. To fully cater for this principle, this would mean generating different classifiers (prediction functions) for each radio. However, this would lead to a much smaller training dataset and a more complicated (prediction) serving system.

The differences between the radios/APs have mainly implications on the classifier performance measurement(s). Notably, as the prediction performance differs greatly between radios, a precision recall curve for test data that is drawn from multiple radios can be non-representative of the performance we can expect from the individual radios. This is especially true as there is a high correlation between radios with many positives and high predictive abilities.

In addition, different radios also naturally have different optimal sets of parameters, especially the prediction threshold, which is the parameter governing the trade-off between precision and recall.

Referring again to FIG. 4, hybrid classification framework 408 may be configured to train a set of base classifier, in various embodiments. This can be achieved as follows:

Create several subsets of radios/APs, ideally each subset captures a different class of radios with similar characteristic. In one embodiment, this can be done based on prior knowledge of the radios whereabouts and usage whereas, in another embodiment, this could be performed based purely on metrics related to the labels distribution. In a further embodiment, framework 408 may use a machine learning-based clustering technique to cluster the APs based on the various radio and traffic characteristics of the APs. Note that grouping radios/APs used for a given model is key for the performance of the related base classifier. To safeguard against misrepresented radios, framework 408 may also include one group containing the entire radios set.

Using the labeled data prepared by data preparer 406, train a classifier on each subset (group) of radios/APs. These base classifiers can use any suitable machine learning-based approach, such as LSTM or xgboost, depending on the amount of data and measured generalization abilities.

According to various embodiments, hybrid classification framework 408 may also select the most appropriate one of the classifiers, for predicting issues for a particular AP of interest. To do so, framework 408 may use a period of X days in the past (e.g. 2, 3 or 4 weeks), denoted as a lookback period (e.g., a history of network characteristics is associated with the AP of interest), to apply the trained classifier to the network characteristics associated with the AP of interest that are from this time period. In doing so, each model may predict whether a threshold number of onboarding delays are expected for a given time period, based on the network characteristics from that time period.

By testing the classifiers against a history of network characteristics associated with a particular AP, hybrid classification framework 408 can compute one or more classifier performance metrics for the tested classifier(s). Notably, framework 408 may compare the onboarding delay predictions from the historical characteristics to the onboarding information from the tested time period, to assess which of the classifiers demonstrated the best performance. In various embodiments, framework 408 may then select the classifier with the best performance, or performance above an acceptable threshold, to analyze/monitor the AP in production. For example, framework 408 may select a classifier that has a minimal precision of at least 70-90%, to assess the AP.

Given a test example, the prediction of most classifiers in a classification setting is a probability over the space of classes. For binary classification, a prediction is essentially a pair [alpha, 1-alpha] where 0≤alpha≤1. The semantic meaning of it is that the classifier assigns alpha chance of the test example belonging to class '0' and 1-alpha chance that it belongs to class '1.' The specific alpha after which the example is assigned to class 1, is then just another parameter, i.e., a prediction threshold. If none of the base models offer acceptable performance for a given AP in the monitored network, hybrid classification framework 408 may prevent the classifiers from classifying the characteristics associated with the AP for a given amount of time (e.g., do not predict for the next 24 hours, the same as predicting no errors).

For a given radio/AP, hybrid classification framework 408 may take as input any or all of the following, which may be predefined or received from a user interface (UI):

Set of pre-trained base classifiers $\{c_1, \ldots c_N\}$. The classifiers differ by either the subset of radios date used in the training, or the model (classifier) parameters.

Minimal precision value, $\min\_p_f$ (e.g., 0.75, 0.8, 0.85, etc.).

Precision and recall tradeoff value: beta.

Initial lookback period (e.g., 14 and/or 28 days)

Walk forward time interval (e.g., 1 day)

Assume that the AP's input data is given in the appropriate feature representation and is divided into consecutive batches of the walk forward time intervals: $f_1, \ldots, f_T$. In such a case, hybrid classification framework 408 may operate according to the following pseudocode:

For t in [Initial lookback period to T]:
  For each $c_i$ in $\{c_1, \ldots, c_N\}$:
    Evaluate the precision and recall of $c_i$ on $f_1, \ldots, f_t$, let $p_i$, $r_i$ denote the respective precision and recall.
    If $p_i < \min\_p_r$: continue
    Otherwise: Compute a single value $v_i$ for $p_i$ and $r_i$ using beta $$F_\beta = (1 + \beta^2) \cdot \frac{\text{precision} \cdot \text{recall}}{(\beta^2 \cdot \text{precision}) + \text{recall}}.$$

Use $c_i$, corresponding to the highest $v_i$ to predict for $f_{t+1}$. If no $c_i$ achieves the minimal precision value on the data $f_1, \ldots, f_t$, then do not predict for $f_{t+1}$. This is equivalent to predicting label 0.

In some embodiments, hybrid classification framework 408 may use gradient boosted decision trees as the base classifiers. However, it may be possible, in further embodiments, to enhance the accuracy of the base classifiers by using an LSTM (or GRU) instead of tree based classifiers. Framework 408 may use any or all of the following parameters to control the classifier generation:

XGB parameters—number of estimators and depth.

Subsampling of the training data: naturally there many more negative examples (label 0) than positive examples (label 1). To provide balance to the training data, framework 408 may try a down-sample of the negative examples such that the resulting train data has a ratio of 1:10 or 1:100 between positive and negatives. This just means keeping all of the positive examples, while randomly sampling negative examples until we get a 1:X ratio.

Features time window—framework 408 may also bucketize the network and onboarding signal to measurements in a defined time window (e.g., 5-minutes, etc.). However, as a feature representation, a longer time frame may be used, as it is believed that the label (e.g., the number of long onboarding delays greater than 1) is influenced by network activities during a longer time frame. For this purpose, n-number of consecutive timer intervals can be used as feature vectors for training (e.g., 6 consecutive 5-minutes intervals for a total of 30 minutes.

Clusters of radios—while the split between training and test radio/AP data (e.g., ⅔ training, ⅓ testing) may be made randomly, experimentation has shown that better results are achievable when training is performed using data associated with a set of similar APs. Thus, in further embodiments, framework 408 may make this split based on the amount of positive examples. While there probably other factors which differentiate radios/APs, the number of positives seems to serve as a good proxy for this crude clustering. For example, during testing, four groups were formed, with the first three corresponding to the percentiles 40%-60%, 60%-80%, 80%-100% of the amount of positives (the lower <40% seemed like a bad choice throughout), and the $4^{th}$ set containing all of the training radios.

Features—these can be divided into four sets:
   Error/label related features (in features time)
   Roaming features
   Radio properties
   Time related features Two different sets of features were assessed, during experimentation:
   Feature set1: All of the above features (all four groups)
   Feature set2: All of the above feature excluding the error related features, plus an additional feature which is the number of actual onboardings at prediction While the results using the Feature set1 give a real indication of the achievable performance, Feature set2 is more of a hypothetical experiment to see how much signal there is in the pure roaming features (without the past onboardings problems).

Figure 7:
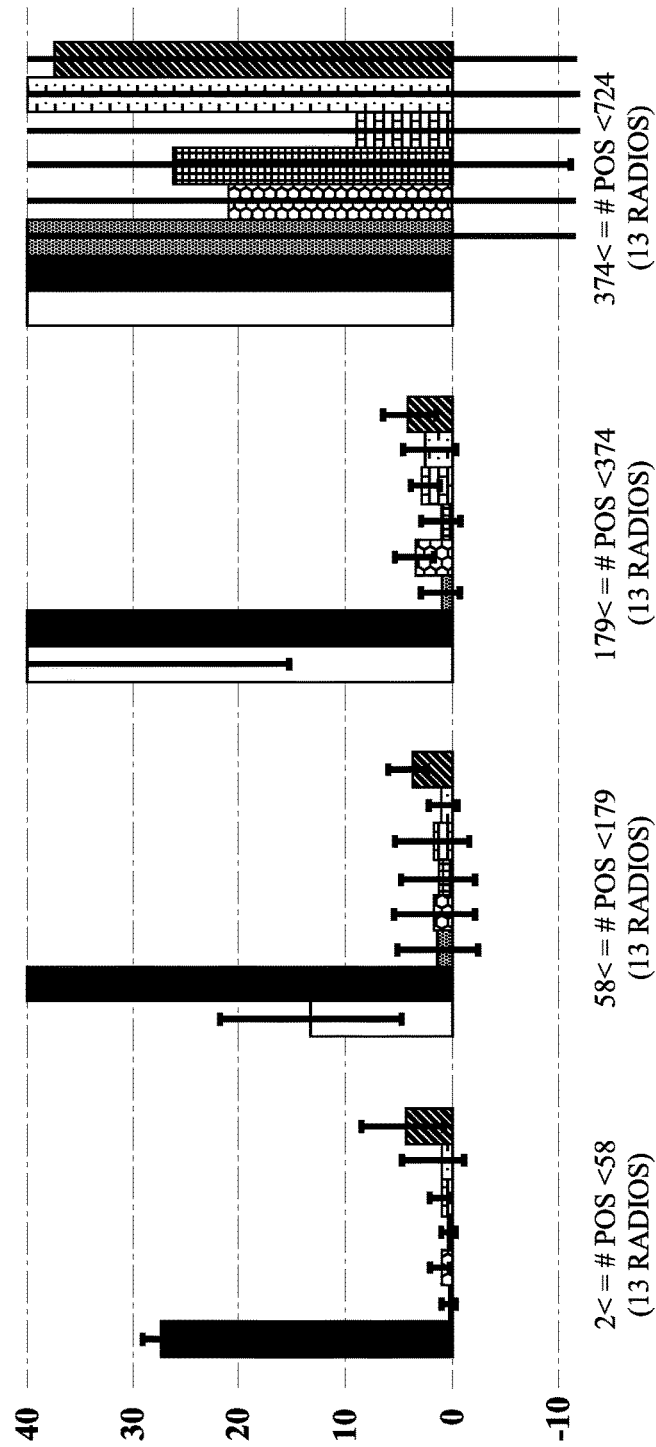
FIG. 7 illustrates an example plot of classifier performances.

As a baseline during testing, the classifiers were trained to predict, for a time T+30, the label at time T. Essentially, whenever there is a positive label (number of long onboardings>=1) at current time, a prediction is made that this is going to be the label at forecasting time (30 minutes in the future). Testing results using the techniques herein are shown in FIG. 7. In particular, plot 700 shows the resulting classifier performances for the 14 day lookback period in terms of absolute number of true positives (TPs) and false positives (FPs), which may affect performance metrics such as precision and recall.

Also as noted, various centralized and distributed implementations are possible with the techniques herein. For example, in a first mode of operation, the prediction (forecasting) task may be performed in the cloud. To that end, telemetry from the networking entities may be sent to the central prediction engine. In a second mode of operation, however, the base classifiers may be downloaded at the edge of the network, typically on a wireless controller. In a such a case, the local telemetry is not send to the cloud and the classifier selection may be performed locally on the network entity.

The network assurance service may also report classifier performance information (e.g., via output and visualization interface 318 shown in FIG. 4). For example, precision is usually considered as the most critical performance metric for forecasting (e.g., favoring precision over recall). Precision is centrally available in centralized implementations and may be reported by each remote agent in the distributed case. Reported precisions are then provided back to the user interface, and minimal precision value may be dynamically adjusted according to user feedback.

Figure 8:
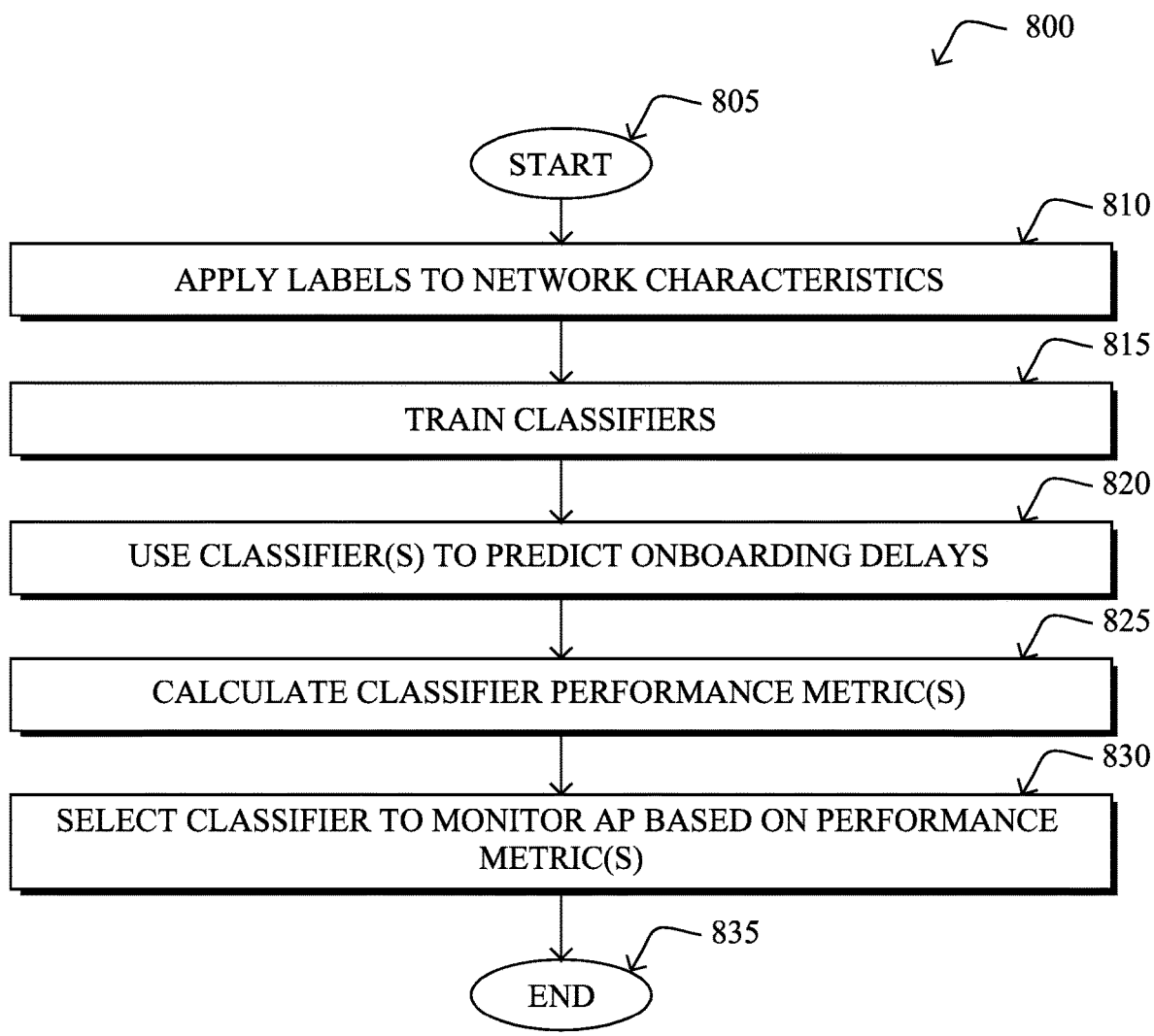
FIG. 8 illustrates an example simplified procedure for selecting a classifier to monitor a wireless access point.

FIG. 8 illustrates an example simplified procedure for selecting a classifier to monitor a wireless access point in a network in accordance with one or more embodiments described herein. For example, a non-generic, specifically configured device (e.g., device 200) may perform procedure 800 by executing stored instructions (e.g., process 248) to implement a network assurance service that monitors a network. The procedure 800 may start at step 805, and continues to step 810, where, as described in greater detail above, the service may apply labels to feature vectors of network characteristics associated with a plurality of wireless access points in the network. In general, an applied label for a feature vector indicates whether the wireless access point associated with the feature vector experienced a threshold number of onboarding delays within a given time window. For example, if an onboarding delay is one that exceeded a minute or more, and a threshold of at least one delay is used, the service may assign a '1' to the time window.

At step 815, as detailed above, the service may train, based on the feature vectors and labels, a plurality of machine learning-based classifiers to predict onboarding delays. In various embodiments, these may be gradient boosted decision trees or other form of machine learning-based classifier. In some cases, the training may also entail clustering/grouping APs according to their characteristics (e.g., APs in a certain type of location, etc.) and the data associated with this subset used for classifier training.

At step 820, the network assurance service may use one or more of the trained plurality of classifiers to predict onboarding delays for a particular wireless access point, as described in greater detail above. In various embodiments, this may entail applying one or more of the classifier to a history of characteristics for a particular AP (e.g., a 14 day lookback, a 28 day lookback, etc.).

At step 825, as detailed above, the network assurance service may calculate one or more classifier performance metrics for the one or more trained classifiers based on the predicted onboarding delays for the particular wireless access point. For example, the service may compare the predictions for the assessed history to the observed onboarding delay events during the historical time period, to assess the true positives, true negatives, etc. that resulted. In turn, these values may be used to calculate a precision, recall, or other performance measure for the classifier.

At step 830, the network assurance service may select a particular one of the trained classifiers to monitor the network characteristics associated with the particular wireless access point, based on the one or more calculated classifier performance metrics, as described in greater detail above. For example, the classifier having the highest precision, or at least above an acceptable threshold, may be selected to monitor and assess live data regarding the particular AP in the monitored network. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the prediction and forecasting of roaming issues in a network, such as those caused by excessive onboarding delays attributable to the network. In some aspects, classifier training may be performed using data associated with any number of APs. In turn, the applicability and performance of the trained classifiers may be assessed, to select and assign a particular classifier to a particular AP for purposes of monitoring the AP.

While there have been shown and described illustrative embodiments that provide for predicting and forecasting roaming issues, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
applying, by a network assurance service that monitors a network, labels to feature vectors of network characteristics associated with a plurality of Wi-Fi wireless access points in the network, wherein an applied label for a feature vector indicates whether a wireless access point associated with the feature vector experienced a threshold number of onboarding delays within a given time window, wherein an onboarding delay is determined by an amount of time exceeding a delay threshold, the amount of time indicative of when a client attempts to initially join the network or roams between wireless access points of the network;
training, by the network assurance service and based on the feature vectors and labels, a plurality of machine learning-based classifiers to predict onboarding delays;
using, by the network assurance service, one or more of the trained plurality of classifiers to predict onboarding delays for a particular wireless access point;
calculating, by the network assurance service, one or more classifier performance metrics for the one or more trained classifiers based on the predicted onboarding delays for the particular wireless access point and a history of onboarding delays; and
selecting, by the network assurance service, a particular one of the trained classifiers to monitor the network characteristics associated with the particular wireless access point, based on the one or more calculated classifier performance metrics.

2. The method as in claim 1, further comprising:
using, by the network assurance service, the selected classifier to classify the network characteristics associated with the particular wireless access point, in order to predict onboarding delays for the particular wireless access point; and
initiating, by the network assurance service, a change to the monitored network to mitigate the predicted onboarding delays for the particular wireless access point.

3. The method as in claim 1, wherein the one or more classifier performance metrics comprise at least one of: a classifier precision or a classifier recall.

4. The method as in claim 1, wherein training, based on the feature vectors and labels, a plurality of machine learning-based classifiers to predict onboarding delays comprises:
generating a plurality of subsets of the wireless access points in the network, each subset comprising wireless access points that have similar network characteristics; and
training, for each subset of wireless access points, at least one machine learning-based classifier to predict onboarding delays using the feature vectors and labels associated with the wireless access points in the subset.

5. The method as in claim 4, wherein generating the plurality of subsets of the wireless access points comprises:
using a machine learning-based clustering process on the network characteristics, to form the subsets of wireless access points.

6. The method as in claim 1, wherein using one or more of the trained plurality of classifiers to predict onboarding delays for the particular wireless access point comprises:
obtaining a history of network characteristics associated with the particular wireless access point from a defined time period; and
using one or more of the plurality of classifiers on the history of network characteristics associated with the particular wireless access point, to predict onboarding delays for the defined period of time.

7. The method as in claim 6, wherein calculating the one or more classifier performance metrics for the one or more trained classifiers based on the predicted onboarding delays for the particular wireless access point comprises:
obtaining a history of onboarding delays from the defined time period; and
comparing the history of onboarding delays from the defined time period to the predicted onboarding delays for the defined time period.

8. The method as in claim 1, further comprising:
determining, by the network assurance service, that predicted onboarding delays for a second one of the wireless access points by one or more of the trained classifiers results in a performance metric for the one or more trained classifiers being below a threshold; and, in response
disable, by the network assurance service, the plurality of classifiers from classifying network characteristics of the second wireless access point for a period of time.

9. An apparatus, comprising:
one or more network interfaces to communicate with a network;
a processor coupled to the network interfaces and configured to execute one or more processes; and
a memory configured to store a process executable by the processor, the process when executed configured to:
apply labels to feature vectors of network characteristics associated with a plurality of Wi-Fi wireless access points in the network, wherein an applied label for a feature vector indicates whether a wireless access point associated with the feature vector experienced a threshold number of onboarding delays within a given time window, wherein an onboarding delay is determined by an amount of time exceeding a delay threshold, the amount of time indicative of when a client attempts to initially join the network or roams between wireless access points of the network;
train, based on the feature vectors and labels, a plurality of machine learning-based classifiers to predict onboarding delays;
use one or more of the trained plurality of classifiers to predict onboarding delays for a particular wireless access point;

calculate one or more classifier performance metrics for the one or more trained classifiers based on the predicted onboarding delays for the particular wireless access point and a history of onboarding delays; and select a particular one of the trained classifiers to monitor the network characteristics associated with the particular wireless access point, based on the one or more calculated classifier performance metrics.

10. The apparatus as in claim 9, wherein the process when executed is further configured to:
use the selected classifier to classify the network characteristics associated with the particular wireless access point, in order to predict onboarding delays for the particular wireless access point; and
initiate a change to the monitored network to mitigate the predicted onboarding delays for the particular wireless access point.

11. The apparatus as in claim 9, wherein the one or more classifier performance metrics comprise at least one of: a classifier precision or a classifier recall.

12. The apparatus as in claim 9, wherein the apparatus trains, based on the feature vectors and labels, a plurality of machine learning-based classifiers to predict onboarding delays by:
generating a plurality of subsets of the wireless access points in the network, each subset comprising wireless access points that have similar network characteristics; and
training, and for each subset of wireless access points, at least one machine learning-based classifier to predict onboarding delays using the feature vectors and labels associated with the wireless access points in the subset.

13. The apparatus as in claim 12, wherein the apparatus generates the plurality of subsets of the wireless access points by:
using a machine learning-based clustering process on the network characteristics, to form the subsets of wireless access points.

14. The apparatus as in claim 9, wherein the apparatus uses one or more of the trained plurality of classifiers to predict onboarding delays for the particular wireless access point by:
obtaining a history of network characteristics associated with the particular wireless access point from a defined time period; and
using one or more of the plurality of classifiers on the history of network characteristics associated with the particular wireless access point, to predict onboarding delays for the defined period of time.

15. The apparatus as in claim 14, wherein the apparatus calculates the one or more classifier performance metrics for the one or more trained classifiers based on the predicted onboarding delays for the particular wireless access point by:
obtaining a history of onboarding delays from the defined time period; and
comparing the history of onboarding delays from the defined time period to the predicted onboarding delays for the defined time period.

16. The apparatus as in claim 9, wherein the process when executed is further configured to:
determine that predicted onboarding delays for a second one of the wireless access points by one or more of the trained classifiers results in a performance metric for the one or more trained classifiers being below a threshold; and, in response
disable the plurality of classifiers from classifying network characteristics of the second wireless access point for a period of time.

17. A tangible, non-transitory, computer-readable medium storing program instructions that cause a network assurance service that monitors a wireless network to execute a process comprising:
applying, by the network assurance service, labels to feature vectors of network characteristics associated with a plurality of Wi-Fi wireless access points in the network, wherein an applied label for a feature vector indicates whether a wireless access point associated with the feature vector experienced a threshold number of onboarding delays within a given time window, wherein an onboarding delay is determined by an amount of time exceeding a delay threshold, the amount of time indicative of when a client attempts to initially join the network or roams between wireless access points of the network;
training, by the network assurance service and based on the feature vectors and labels, a plurality of machine learning-based classifiers to predict onboarding delays;
using, by the network assurance service, one or more of the trained plurality of classifiers to predict onboarding delays for a particular wireless access point;
calculating, by the network assurance service, one or more classifier performance metrics for the one or more trained classifiers based on the predicted onboarding delays for the particular wireless access point and a history of onboarding delays; and
selecting, by the network assurance service, a particular one of the trained classifiers to monitor the network characteristics associated with the particular wireless access point, based on the one or more calculated classifier performance metrics.

* * * * *

UNITED STATES PATENT AND TRADEMARK OFFICE
CERTIFICATE OF CORRECTION

PATENT NO. : 10,735,274 B2
APPLICATION NO. : 15/880992
DATED : August 4, 2020
INVENTOR(S) : Sharon Shoshana Wulff et al.

Page 1 of 1

It is certified that error appears in the above-identified patent and that said Letters Patent is hereby corrected as shown below:

In the Specification

Column 15, Line 31, please amend as shown:
period (e.g., a history of network characteristics associated Signed and Sealed this
Eighth Day of December, 2020

Andrei Iancu
*Director of the United States Patent and Trademark Office*